United States Patent [19]

Allegre et al.

[11] 4,445,046

[45] Apr. 24, 1984

[54] HIGH POWER IMMERSED TURBO-GENERATOR SET HAVING A GEAR BOX AND EXTERNAL COOLING

[75] Inventors: Jean Allegre, Cravanche; Michel Olivier, Danjoutin, both of France

[73] Assignee: Alsthom-Atlantique, Paris, France

[21] Appl. No.: 394,010

[22] Filed: Jun. 30, 1982

[30] Foreign Application Priority Data

Jun. 30, 1981 [FR] France .................. 81 12869

[51] Int. Cl.[3] .............. F01D 5/08; F03B 13/08; F03B 13/10; H02K 9/12
[52] U.S. Cl. ............................ 290/52; 290/43; 290/54; 310/62; 415/175
[58] Field of Search ............ 290/52, 43, 54; 310/55, 310/62, 63; 415/175, 177, 180

[56] References Cited

U.S. PATENT DOCUMENTS

| 2,381,777 | 8/1945 | Schmidt | 415/175 |
| 4,198,191 | 4/1980 | Pierce | 310/63 |
| 4,308,464 | 12/1981 | Yamamoto | 290/52 |

FOREIGN PATENT DOCUMENTS

| 531328 | 10/1956 | Canada | 290/52 |
| 906723 | 1/1946 | France | 290/52 |
| 1217810 | of 0000 | France . | |
| 1311674 | of 0000 | France . | |
| 1455872 | of 0000 | France . | |
| 2174067 | of 0000 | France . | |

Primary Examiner—G. Z. Rubinson
Assistant Examiner—Shelley Wade
Attorney, Agent, or Firm—Sughrue, Mion, Zinn, Macpeak and Seas

[57] ABSTRACT

The front portion (116) of the immersed turbo-generator bulb houses the alternator (5, 19). The intermediate portion (114) houses the gear box (26), and the rear portion has the turbine (122 projecting therefrom. The intermediate portion is of greater diameter than the front portion and they are interconnected by a flange (2). The external cooling is by tubes (7) through which cooling air flows, and having one end connected to orifices through the flange (2).

4 Claims, 2 Drawing Figures

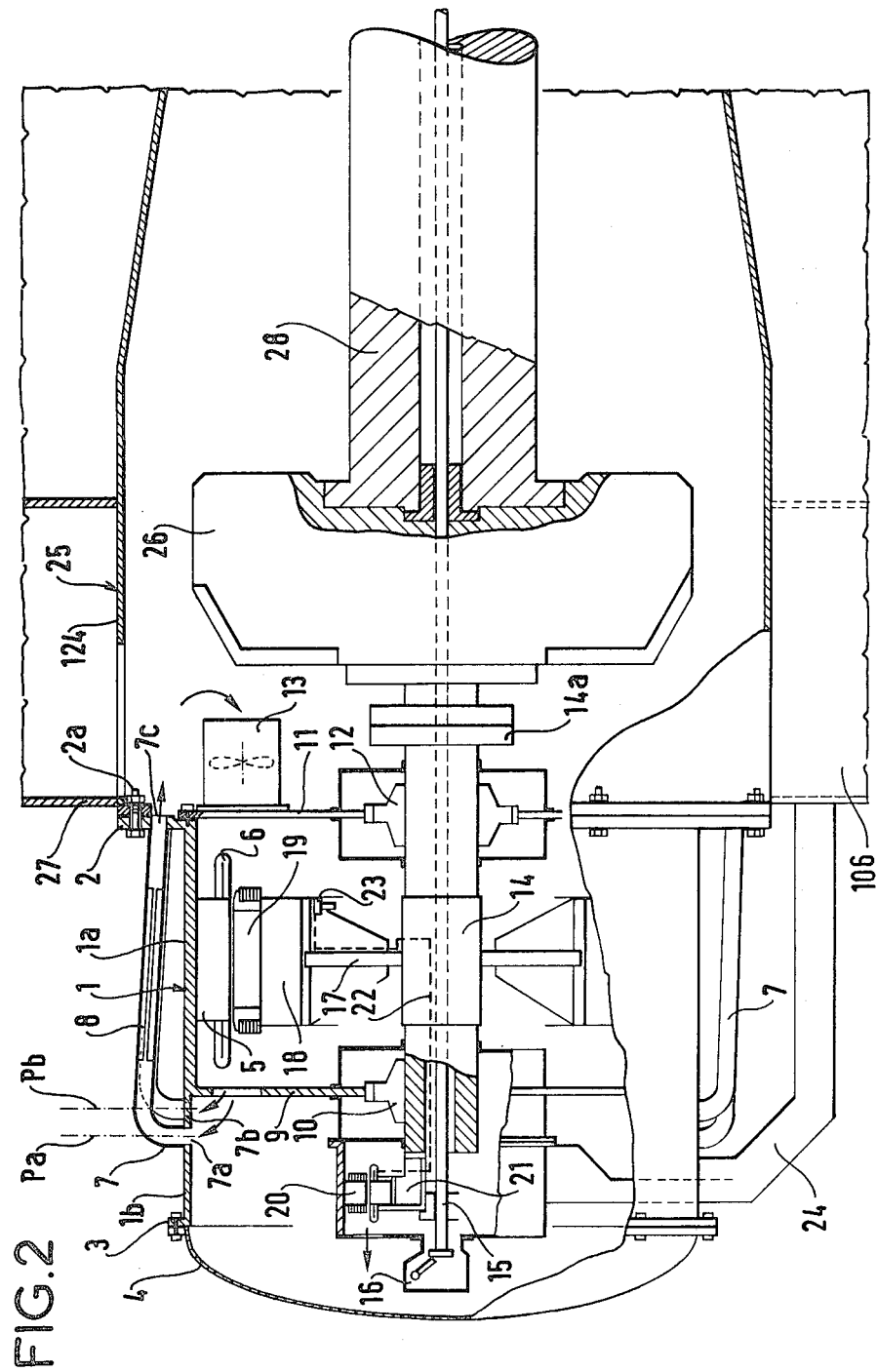

HIGH POWER IMMERSED TURBO-GENERATOR SET HAVING A GEAR BOX AND EXTERNAL COOLING

The present invention relates to a high power immersed turbo-generator set including a gear box and having external cooling. High power in this context means at least 5 MW; say between 5 MW and 20 MW.

BACKGROUND OF THE INVENTION

A first known immersed turbo-generator set of this type comprises:

an elongate housing having a longitudinal axis, and immersed in a duct through which water flows;

a turbine mounted in the rear portion of the housing on a shaft that runs along the axis of the housing, the turbine blades projecting radially from the housing to be rotated by the flow of water;

a gear box disposed in an intermediate portion of the housing, the gear box being driven by the turbine shaft and driving an alternator shaft at a higher speed than the turbine shaft, the alternator shaft extending forwardly;

an alternator rotor mounted on said alternator shaft in a front portion of said housing;

an alternator exciter mounted on the alternator shaft to provide excitation current to the rotor; and an alternator stator surrounding the rotor and including windings, a magnetic circuit and a supporting casing which surrounds the magnetic circuit and is in contact therewith.

The stator casing also constitutes a portion of the housing to dump a portion of the heat generated in the magnetic circuit directly into the water. The alternator is also provided with a gas cooling circuit.

A second immersed turbo-generator is similar, but does not have a gear box. It has a gas cooling circuit having tubes that are on the outside of the housing in order to cool the gas by means of the water flowing along the duct. Each tube is connected to the housing via two orifices, one at each end of the tube.

The front end orifices are arranged in a staggered configuration occupying two different transverse drilling planes in front of the alternator stator, the longitudinal distance separating said transverse drilling planes being at least equal to the diameter of the orifices to avoid exessively weakening the mechanical strength of the housing in the vicinity of said drilling planes. The rear end orifices are arranged in the same manner as the front end orifices, i.e. in two different planes.

Both generator sets are provided with an access tube running from the housing to the outside wall of the duct to give a way into the housing from outside the duct.

In the first generator set, said access tube leads to the intermediate portion of the housing where the gear box is located.

Both of these known generator set suffer from the drawback of great length which leads to high civil engineering costs to build a suitable water duct to house them. Further, where there is a gear box, access to the inside of the housing is made difficult because of the small amount of radial space left free around the gear box. Finally the front and the intermediate portions of the housings are interconnected by a flanges that project inwardly, hindering access to the electrical connections behind the alternator stator.

Preferred embodiments of the present invention provide a high power turbo-generator set with a gear box, but of reduced overall length, and with eased access to the housing for maintenance of the alternator. Mechanical strength of the housing is not jeopardized.

SUMMARY OF THE INVENTION

The present invention provides a high power immersed turbo-generator set having external cooling and a gear box, wherein the generator set comprises:

an elongated external housing having a longitudinal axis and immersed in a water duct;

a turbine mounted on the rear portion of said housing on a shaft extending along the housing axis, the turbine having blades that project radially outwardly from said housing to be rotated by a flow of water along said duct;

a gear box housed in an intermediate portion of said housing, driven by the turbine shaft, and driving an alternator shaft at higher speed than the turbine shaft, the alternator shaft extending into a front portion of the housing;

an alternator rotor mounted on said alternator shaft in a front portion of said housing;

an alternator exciter mounted on the alternator shaft to provide excitation current to the rotor; and an alternator stator surrounding the rotor and including windings, a magnetic circuit and a supporting casing which surrounds the magnetic circuit and is in contact therewith;

said stator casing constituting a portion of the housing whereby a portion of the heat generated in the magnetic circuit is directly dumped into the water flowing along the duct;

the alternator constituted by said rotor, said exciter and said stator being provided with a gas cooling circuit through which a cooling gas is made to flow;

said cooling circuit including external cooling tubes disposed outside the housing to enable the cooling gas to be cooled by the water flowing in the duct, each of said tubes running from a front end orifice in the housing to a rear end orifice in the housing;

the front end orifices being arranged in a staggered configuration occupying two different transverse drilling planes in front of the alternator stator, the longitudinal distance separating said transverse drilling planes being at least equal to the diameter of the orifices to avoid excessively weakening the mechanical strength of the housing in the vicinity of said drilling planes;

an access tube being provided between the intermediate portion of the housing and the outside wall of the surrounding water duct to provide access to the inside of the housing from outside the duct; and wherein the front and the intermediate portions of the housing are of different diameters and are interconnected by a flange having an inside diameter equal to the diameter of the front portion and an outside diameter equal to the diameter of the intermediate portion, with the rear end orifices of the cooling tubes passing through said flange.

The rear end orifices can be placed easily without risk to the mechanical strength of the housing and without lengthening the generator set at all, this is largely because flanges have to be thick and strong to transmit the forces developed by the flange bolts. Further, the greater diameter of the intermediate portion of the housing compared with the front portion provides extra space around the gear box. Finally, since the flange does not project inwardly relative to the front portion, more room is left for access to the electrical connections on the alternator.

BRIEF DESCRIPTION OF THE DRAWINGS

An embodiment of the invention is described by way of example with reference to the accompanying drawings. The same items appearing in more than one figure are designated by the same reference numeral in all of them. In the drawings:

FIG. 2 is a partially cut-away side view on an enlarged scale of a portion of FIG. 1 showing the front and intermediate portions of its housing.

MORE DETAILED DESCRIPTION

Figure 1:
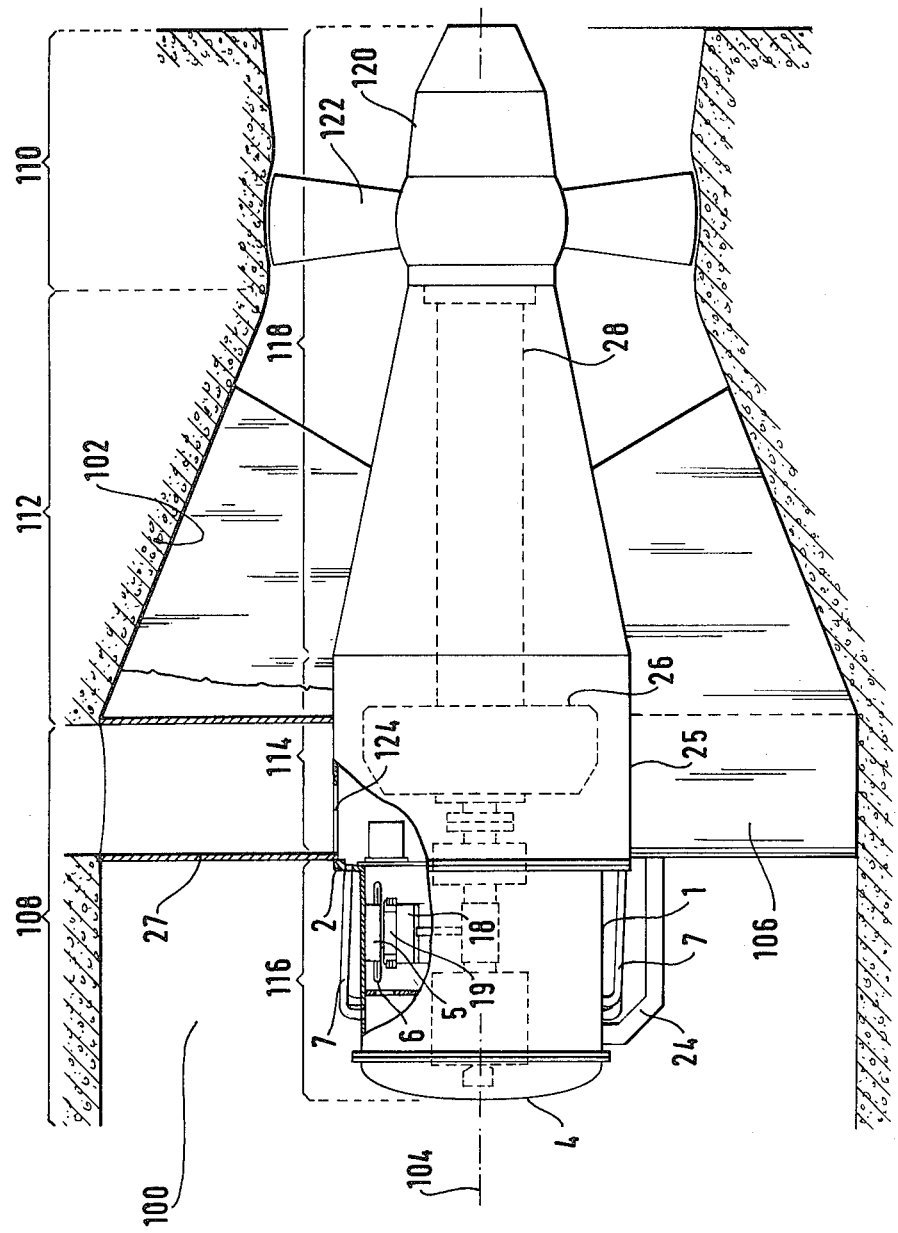
FIG. 1 is a partially cut-away side view of an immersed turbo-generator set in accordance with the invention located inside a water duct.

The immersed turbo-generator set described with reference to the drawings extends along a horizontal axis 104 of a duct 100 of circular cross section through a dam. The dam is made essentially of concrete, and portions of the concrete are referenced 102. A front portion 108 of the duct is of larger diameter than a rear portion 110, and there is an intermediate conical portion 112 interconnecting the portions of different diameters. Angularly spaced "pre-director" director blades 106 project radially in from the wall of the conical portion of duct 112.

These pre-director blades support an intermediate portion 114 of the housing 25 of an immersed turbo-generator set which also has a front portion 116 and a rear portion 118.

The rear edges of the pre-director blades are inclined relative to the front edges in such a way as to impart a degree of rotation to water flowing along the duct from the front end towards the rear end.

One of the pre-director blades 27 is hollow to provide an access tunnel to the inside of the housing 25 coming down from a passage through the dam.

Going downstream from its front end, the housing comprises:

a cap 4 closing its front end;

a sleeve 1 having a rear portion 1a of greater wall thickness than its front portion and constituting the outer casing of the alternator of the generator set;

a cylindrical intermediate envelope 124 held by the predirector blades 106 constituting the said intermediate portion 114 and providing the mechanical support for the generator set. This envelope includes a gear box 26 placed between the turbine shaft 28 and the alternator shaft 14; and a turbine 120 closing the rear or downstream end of the housing 25 and having turbine blades 122 projecting therefrom. The turbine drives the turbine shaft 28 which then drives the alternator shaft 14 at higher revolutions via the gear box 26.

The alternator located in the front portion of the housing 25 comprises a stator, a rotor, and an exciter.

The stator comprises:

said casing constituted by the thicker portion of the sleeve 1a and in direct contact with the water in the duct. The sleeve 1 has a rear flange 2 for fixing to the intermediate envelope 124 and a front flange 3 for fixing to the cap 4;

a front disk 9 welded to the sleeve 1 on the other side of the alternator to the turbine and serving as a support for a front guide bearing 10 for the alternator shaft; and a removable rear disk 11 on the turbine side of the alternator serving as a support for a rear guide bearing 12.

The rotor comprises:

the shaft 14 having a flange 14a for connection to the shaft from the gear box. The alternator and turbine shafts have a common longitudinal bore for passing a tube 15 for transmitting the angular position of the turbine blades to a blade control device 16.

The shaft is fitted with a cross piece 17 for supporting and driving a rim 18 having the poles of rotor windings 19 mounted on its surface.

The exciter comprises:

a fixed inductor 20 fixed to the front disk 9; and a rotating inductor 21 coupled to that end of the alternator shaft 14.

Alternating current generated by said inductor is transmitted to the poles 19 of the rotor winding via connections 22 passing along said bore in the shaft 14. This AC is rectified by a diode bridge 23 situated on the turbine side of the rotor.

The front portion of the alternator housing has no physical connection with the mass of the dam, so a sealed tubular duct 24 serves to convey the cables and the pipework located in said front portion to the front edge of the bottom one of the pre-director blades 106.

The alternator is cooled not only be contact between its casing 1 and the water flowing along the duct 100, but also by a gas cooling circuit which preferably uses air. The cooling gas is circulated by motor-fan sets 13 fixed over openings in the rear disk 11. To complete the circuit, external cooling tubes 7 pass outside the housing 25 from the front end of the alternator to the rear end and serve to cool the cooling air by means of the driving water flow.

These tubes run from front openings 7a or 7b to rear openings 7c through the housing 25.

The centers of the front openings 7a or 7b are located in two different transverse drilling planes Pa and Pb upstream from the stator 5,6 of the alternator. The longitudinal distance between said drilling planes is at least equal to the diameter of the orifices in order to avoid excessively weakening the mechanical strength of the housing 25 in the vicinity of the drilling planes.

The rear communication orifices are drilled through the connecting flange 2 which is plane and thick enough to stand up to the localised forces exerted by the flange bolts 2a. This means that it is also thick enough not to be excessively weakened by drilling the rear orifices 7c. The opposite is true of the front portion of the sleeve 1 which is made as thin as possible to avoid the front portion 116 being too heavy.

Drilling through the flange 2 avoids the need for extra length of housing at the rear of the alternator comparable to the extra length needed for the off-set drilling planes at the front of the alternator. However, the extra length needed at the front of the alternator is not wasted, since it is already required to house the exciter.

Further, the tubes are relative easy to fix at their rear ends.

Also, the larger diameter of the intermediate portion of the housing 25 compared with the front portion is disposed around the gear box where it has the advantge of facilitating access to the housing via the access tunnel 27.

Finally, this arrangement avoids the mechanical connection of the front end giving rise to a radial projection into the housing at the rear end of the front end at the rear of the stator with its electrical connections.

Access is not provided to the front portion of the housing in order to avoid the generator set occupying too much room.

The external cooling tubes are provided with internal fins 8 to improve heat transfer between the air and the water and to increase the partial condensation of the water vapour in said air. The tubes slope down going rearwardly so that the condensation flows only towards the intermediate portion of the housing and does not flow into the front portion containing the exciter. Even if this precaution is not taken all round, it is still advisable to ensure that the slope of the lower tubes at least is such that any condensation therein tends to flow into the intermediate portion of the housing rather than collecting in the front portion below the exciter.

We claim:

1. A high power immersed turbo-generator set having external cooling and being a gear box, wherein the generator set comprises:

an elongated external housing having a longitudinal axis and immersed in a water duct;

a turbine mounted on the rear portion of said housing on a shaft extending along the housing axis, the turbine having blades that project radially outwardly from said housing to be rotated by a flow of water along said duct;

a gear box housed in an intermediate portion of said housing, driven by the turbine shaft, and driving an alternator shaft at higher speed than the turbine shaft, the alternator shaft extending into a front portion of the housing;

an alternator rotor mounted on said alternator shaft in a front portion of said housing;

an alternator exciter mounted on the alternator shaft to provide excitation current to the rotor; and an alternator stator surrounding the rotor and including windings, a magnetic circuit and a supporting casing which surrounds the magnetic circuit and is in contact therewith;

said stator casing constituting a portion of the housing whereby a portion of the heat generated in the magnetic circuit is directly dumped into the water flowing along the duct;

the alternator constituted by said rotor, said exciter and said stator being provided with a gas cooling circuit through which a cooling gas is made to flow;

said cooling circuit including external cooling tubes disposed outside the housing to enable the cooling gas to be cooled by the water flowing in the duct, each of said tubes running from a front end orifice in the housing to a rear end orifice in the housing; the improvement comprising:

the front end orifices being arranged in a staggered configuration occupying two different transverse drilling planes in front of the alternator stator, the longitudinal distance separating said transverse drilling planes being at least equal to the diameter of the orifices to avoid excessively weakening the mechanical strength of the housing in the vicinity of said drilling planes;

an access tube being provided between the intermediate portion of the housing and the outside wall of the surrounding water duct to provide access to the inside of the housing from outside the duct; and wherein the front and the intermediate portions of the housing are of different diameters and are interconnected by a flange having an inside diameter equal to the diameter of the front portion and an outside diameter equal to the diameter of the intermediate portion, with the rear end orifices of the cooling tubes passing through said flange.

2. A generator set according to claim 1, wherein the external cooling tubes situated around the bottom of the the front portion of the housing are disposed so that their rear end orifices are at least as low as the remainder of their length whereby any water condensing therein tends to drain through said rear end orifices.

3. A generator set according to claim 2, wherein the longitudinal axis of the housing is substantially horizontal, wherein the exciter is situated in the front of the front portion of the housing, in front of the alternator, and wherein all the cooling tubes slope down towards their rear end openings so that water condensing in any of them tends to flow into the intermediate portion of the housing only, and not into the front portion.

4. A generator set according to claim 1, wherein the front portion of the housing is absent an access in order to minimise the bulk of the generator set.

* * * * *